United States Patent Office 2,762,457
Patented Sept. 11, 1956

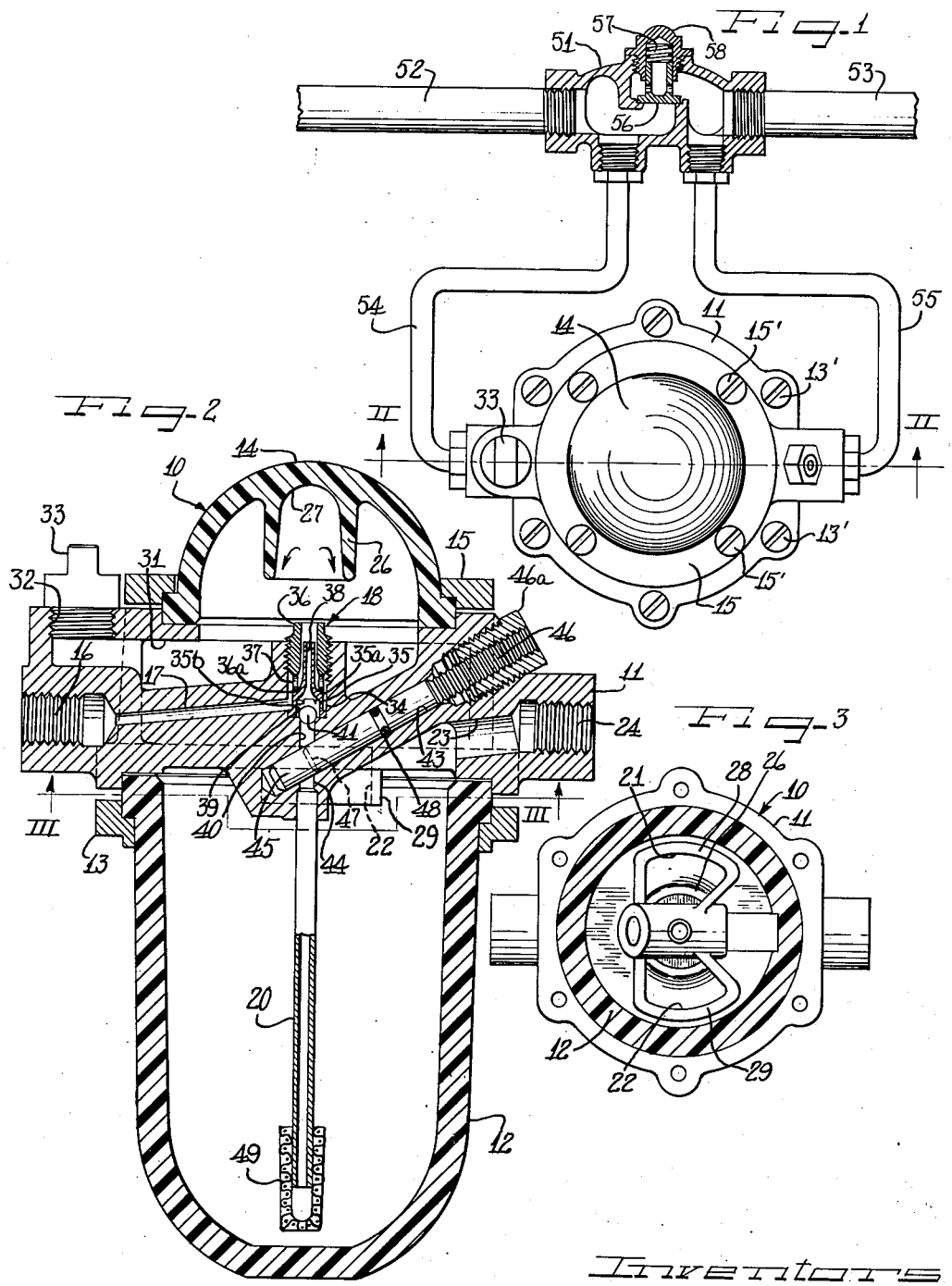

2,762,457

APPARATUS FOR OIL MIST LUBRICATION

Hilmar A. Andresen and Raymond H. Andresen, Chicago, Ill., assignors to Gits Bros. Mfg. Co., Chicago, Ill., a corporation of Illinois Application March 20, 1952, Serial No. 277,668

6 Claims. (Cl. 184—55)

This invention relates to an oil mist lubricator and more particularly to a lubricator for entraining oil in finely divided droplet form in an air carrier medium, the oil droplets being transported by the air to a place where lubrication is desired.

In such a lubricator, it is important that as much oil be entrained in the air as possible so that the desired lubrication will be effected with a minimum of air pressure and flow. At the same time, it is highly desirable that no large droplets be present in the air from the lubricator, since they may adhere to conduits and not reach the place where lubrication is desired.

According to this invention, a lubricator includes a main body with an oil reservoir oil bowl secured to the bottom thereof and a barrier member in the form of an inverted cup or a dome secured to the top hereof. A venturi structure located in the body communicates with an air inlet at the side of the body and with an oil delivery tube extending downwardly into the oil reservoir bowl. The venturi structure entrains the oil in droplet form in air under pressure flowing into the inlet and directs the droplet-carrying air upwardly against the dome barrier from which it flows downwardly through a passage in the body into the oil reservoir bowl above the level of the oil therein and out through an outlet passage in the body to a conduit or the like arranged to carry the droplet-carrying air to a place where lubrication is desired.

This circuitous path, in itself, is highly advantageous. In particular, with the abrupt changes in direction of flow, the droplets will be broken up and reduced in size with larger droplets being removed by centrifugal action and adherence to the surfaces defining the circuitous path so as to be eliminated before reaching the outlet.

In addition, according to an important feature of this invention, the dome barrier may be formed to define a down-facing pocket having a concave surface. The droplet-carrying air directed into this pocket will build up pressure within the pocket, the air under pressure serving to turn the smaller droplets downwardly in umbrella-like fashion while the larger droplets, which have a higher inertia, will travel through the air cushion to impinge upon the concave surface of the pocket and thereby be either broken up into smaller droplets or removed by adherence to the surface.

According to another important feature of this invention, barriers are provided in the path of flow of the droplet-carrying air, preferably as downwardly projecting integral portions on the bottom of the body, to further remove large droplets and prevent the same from reaching the outlet.

Another feature of this invention is in the provision of novel and highly advantageous venturi structure by which the oil flow is in a straight vertical direction.

A further feature of this invention is in the provision of a ball check valve in the oil delivery line for preventing back flow of oil from the venturi structure and give faster action when the lubricator is operated after standing idle.

Still another feature of this invention is in the provision of readily adjustable and accessible valve structure for controlling the flow of oil.

Still another feature of this invention is in the provision of a partial flow lubricator which is connected in parallel relation with an air supply line having a normally-closed valve which opens at a predetermined air pressure, this feature insuring efficient operation of the lubricator over a wide range of input air pressure.

A still further feature of this invention is in the provision of a filling plug in the body itself.

A still further feature of this invention is in the method by which the direction of flow of the droplet-carrying air is abruptly changed, as by the barrier surfaces or air cushion, to reduce droplet size and remove larger droplets.

Although the principles of this invention are particularly and advantageously applicable and herein applied to a method and an apparatus for oil mist lubrication, it will be apparent that they apply wherever it is desired to entrain liquid in finely divided droplet form in a gaseous carrier medium.

An object of this invention, accordingly is to provide apparatus for entraining a liquid in finely divided droplet form in a gaseous carrier medium in which the path of the droplet-carrying gaseous medium is abruptly changed to reduce droplet sizes and remove larger droplets.

Another object of this invention is to provide an improved method for entraining a liquid in finely divided droplet form in a gaseous carrier medium by which the path of flow of the droplet-carrying gaseous stream is abruptly changed to reduce droplet sizes and remove larger droplets.

A further object of this invention is to provide an improved venturi structure for entraining a liquid in droplet form in a gaseous carrier medium.

Still another object of this invention is to provide an improved oil mist lubricator having a circuitous flow path.

A still further object of this invention is to provide improved valve structure for an oil mist lubricator.

Still another object of this invention is to provide an improved oil mist lubricator which is efficient in operation, durable and readily and economically manufacturable.

A still further object of this invention is to provide a partial flow oil mist lubricator having improved valve structure insuring efficient operation of the lubricator over a wide range of air pressure.

This invention contemplates other objects, features and advantages which will become more fully apparent from the following detailed description taken in conjunction with the accompanying drawings which illustrate a preferred embodiment and in which:

Figure 1 is a top plan view of a lubricator constructed according to the principles of this invention arranged in parallel with a flow distributing valve in an air supply conduit.

Figure 2 is a sectional view taken substantially along the lines II—II of Figure 1 and illustrating the details of the lubricator construction; and Figure 3 is a sectional view taken substantially along the lines III—III of Figure 2.

As shown on the drawings:

Reference numeral 10 generally designates a lubricator constructed according to the principles of this invention which includes a main body 11, a generally cup-shaped oil bowl or reservoir 12 secured to the bottom face of the body 11 by a retaining ring and an inverted cup-shaped member or dome 14 secured to the upper face of the body 11 by a retaining ring 15. The retaining rings 13 and 15 are affixed to the body 11 by screws 13' and 15', respectively (Fig. 1).

The body 11 may preferably be a metal casting while the lubricant bowl 12 and dome 14 are preferably of a translucent material such as, for example, a clear plastic, to permit visibility of the oil level and the droplet-entraining action.

The body 11 has an air inlet 16 communicating through a passage 17 with an air-oil mixing structure generally designated by reference numeral 18 which receives oil from the reservoir 12 through a delivery tube 20 and which forms a means for entraining the oil in the air. The air-oil mixture is directed upwardly and impinged against the dome 14 and from there travels through a pair of openings 21 and 22 in the body 11, Figure 3, above the level of the oil in the bowl 12 and out through a passage 23 in the body 11 to an outlet 24.

The flow through the lubricator 10 is indicated by arrows in Figure 2. The circuitous path of the droplet-carrying air is highly advantageous. In particular, with the abrupt changes in direction of flow, the droplets will be broken up and reduced in size while the larger droplets will be removed by centrifugal action and by adherence to the surfaces defining the circuitous path so as to be eliminated before reaching the outlet.

According to a specific feature of this invention, the results obtained by this advantageous method of reducing droplet size and eliminating larger droplets by abrupt change in direction of flow are enhanced by providing an air cushion in the path of the droplet-carrying air. As shown in Figure 2, the barrier dome 14 has an integral downwardly extending tube-like portion 26 defining a pocket 27 having a concave surface facing the mixing structure 18. The droplet-carrying air stream from the structure 18 will build up pressure within the pocket 27 and an air cushion. The smaller oil droplets will not penetrate this air cushion but will be turned back and downwardly in a generally umbrella-like path as indicated by the arrows in Figure 2. The larger droplets, having a higher inertia, will penetrate this air cushion and strike the inner concave surface of the pocket 27 and will either be broken up into smaller particles or will adhere to the surface so as to be removed from the oil droplet-carrying air stream. As the larger droplets accumulate on the surface they will flow downwardly and drip off the tube-like structure 26 onto the top of the body 11 and from there through the openings 21 and 22 into the oil reservoir bowl 12. The size of the pocket 27 required for most efficient operation is somewhat critical and depends on the velocity of the oil droplet-carrying air stream.

According to another important feature of this invention, additional barriers are provided to enhance the removal of larger droplets from the air stream and to enhance the entrainment of minute droplets in the air stream. For this purpose, the body has downwardly extending barrier portions 28 and 29 around the openings 21 and 22, respectively, which prevent the air streams through the openings 21 and 22 from flowing directly to the outlet passage 23 and force a somewhat abrupt change in the directions of the air streams.

By another feature of this invention, provision is made in the body 11, itself, for draining and filling the oil reservoir bowl 12. As shown in Figure 2, the body 11 has a passage 31 therein communicating with the chamber defined by the dome 14 and the top of the body and with an internally threaded opening 32 arranged to receive an externally threaded plug 33. It will be noted that the filling plug 33 is thus readily accessible at the top of the body 11 and that the body 11 may be readily cast with the passage 31.

The mixing structure generally designated by reference numeral 18 forms another important feature of this invention. As best illustrated in Figure 2, this structure is disposed in a centrally located upwardly open chamber 34 communicating with the air inlet passage 17. An oil nozzle 35 is disposed in the chamber 34 and is secured therein by a ring 36 threaded into the upper end of the chamber 34. The lower shoulder 36a of the ring 36 cooperates with the shoulder 35a to force the nozzle 35 securely against the lower end of the chamber 34. The nozzle 35 has an intermediate reduced diameter portion defining an air space communicating with the inlet passage 17 and an upper portion of further reduced diameter less than the inner diameter of the ring 36. To provide for flow of air into the central opening of the ring 36, the ring 36 has radially spaced apertures 37 defining air passages therethrough. It will be apparent that the path of air flow from the inlet has a reduced cross-sectional area adjacent the upper end of the nozzle 35 thus providing a venturi effect with increased air velocity and decreased air pressure adjacent the end of the nozzle 35 which may draw oil therefrom.

The nozzle 35 has a central oil passageway 38 which is enlarged at the lower end thereof to define a chamber 39 which is concentric with an oil flow passage 40 in the body 11. To prevent back flow of oil, a ball 41 is disposed in the chamber 39 and seals off the passage 40 when upward flow of oil is not induced. Thus quick operation of the lubricator is insured after periods of inoperation. As a precautionary measure to prevent the ball 41 from closing the passageway 38 during upward flow, the nozzle 35 is staked or deformed at 35b to prevent ball 41 from rising from its seat on the pasage 40 to an excessive amount.

A still further feature of this invention is in the provision of easily accessible and readily operable valve structure for controlling the flow of oil to the mixing structure 18. A bore 43 intersects between the oil passage 40 and an oil passage 44 aligned with the passage 40 and communicating with the oil delivery tube 20. The bore 43 extends to the top of the body 11 at one side of the dome 14 and a valve member 45 having an actuating end 46 is journaled in the bore 43. The valve member 45 is shown in solid lines in its closed position. Upon rotation the valve plunger 45 assumes the position shown by the dotted line 47. Thus the flow of oil can be readily controlled by rotation of the member 45. If desired, a sealing washer 48 may be provided on the member 45. A threaded nut 46a is provided at the outer end of valve plunger 45 in order to permit construction of the member 45 from a bar of constant outside diameter.

To prevent extraneous foreign matter from entering the oil supply tube 20, a filter 49 may be disposed at the lower end thereof.

For some installations, it is desirable that a greater flow of air be maintained than would be efficiently possible through the lubricator 10. Further, the most efficient operating pressure for the lubricator 10 is somewhat critical and it is desirable to reduce fluctuations in the inlet pressure thereto. In view of these considerations, it is advantageous to pass only a part of the air through the lubricator. In other words, the lubricator is constructed to operate efficiently on a minimum flow of air, thus if greater volumes of air are required to operate machinery on other devices, it becomes necessary to by-pass the larger portion of the air used. To provide the optimum pressures the construction shown in Figure 1 is used. This arrangement includes a 4 way fitting 51 having an inlet pipe 52 from the main air supply and an outlet pipe 53 which carries oil laden air to the machinery to be operated. Air may pass directly from pipe 52 through pipe 54 to the inlet 16 of the lubricator 10. This air has oil added to it and it then passes through the lubricator outlet 24, pipe 55, and through the fitting 51 to the pipe 53. A parallel path is provided by the valve 56 which is spring biased into a closed position by spring 57. The spring 57 and valve 56 are positioned in a housing cap 58 which is threaded into the fitting 51. The spring is calibrated so that the greater portion of air passes through the valve 56 to pipe 53 and a lesser quantity passes through the lubricator. However, it is apparent that the spring pressure could be altered to vary the proportional amounts of air that would pass through the lubricator 10 and the valve 56 respectively. With a differential in pressure across the valve 56 above a predetermined value, the flow will be divided between the lubricator 10 and the path through the valve 56. Thus the variation in inlet pressure to the lubricator 10 is substantially reduced and the lubricator may be operated in the range of the most efficient operation.

Although the principles of this invention are particularly and advantageously applicable and herein applied to a method and apparatus for oil mist lubrication, it will be readily apparent that they apply wherever it is desired to entrain liquid in finely divided droplet form in a gaseous carrier madium. It will also be apparent that, although the method and apparatus of this invention is particularly advantageous when used with a non-volatile liquid such as lubricating oil, they may be applied to volatile liquids as well.

It will be understood that modifications and variations may be effected without departing from the spirit and scope of the novel concepts of the present invention.

We claim as our invention:

1. A unit for entraining an essentially non-volatile oil in finely divided droplet form in an air carrier, comprising: a body having a top and a bottom and an air inlet passage extending from one side, an oil supply bowl secured to said bottom, an oil delivery tube secured to said body and within said bowl, entrainment means communicating with said air inlet passage and said oil delivery tube for entraining oil in droplet form in pressurized air from said inlet passage and for directing the flow of droplet carrying air upwardly, a barrier member secured to said top and having a concave surface facing said entrainment means for reuducing droplet size and for removing larger droplets by centrifugal action and by adhesion to said surface, said body having a through passage for flow of droplet-carrying air from said surface to said oil bowl above the level of oil therein, and an outlet passage for flow of droplet-carrying air out of said bowl, and said body having downwardly projecting barriers around said through passage for further removal of larger droplets from the air, a valve member rotatably journaled in said body and extending from said top at one side of said barrier member to a point between said delivery tube and said entrainment means for controlling flow of oil, and a ball check valve between said entrainment means and said delivery tube for preventing back flow of oil.

2. A unit for entraining liquid in finely divided droplet form in a gaseous carrier medium, comprising: a body having a top and a bottom and a gaseous medium inlet passage extending from one side, a liquid supply bowl secured to said bottom, a liquid delivery tube secured to said body and disposed within said bowl, means communicating with said inlet passage and said delivery tube for entraining liquid droplets in the gaseous medium from said inlet passage and for directing flow of droplet-carrying medium upwardly, and a barrier member secured to said top and having a surface portion in the path of droplet-carrying medium from said means, said body having a passage from top to bottom therethrough for flow of droplet-carrying medium from said surface portion into said bowl and having an outlet passage from said bowl to one side of said body.

3. A unit for entraining a liquid in finely divided droplet form in a gaseous carrier medium, comprising: a body having a top and a bottom and a gaseous carrier medium inlet passage therein, means secured to said bottom defining a liquid reservoir, said body having a liquid passage therein communicating with said reservoir, means communicating with said passages for entraining liquid droplets in said gaseous carrier medium and directing flow of the droplet carrier medium upwardly, a barrier member secured to said top for receiving the droplet carrier medium, said body having a bore therein intersecting said liquid passage and terminating in said top at one side of said barrier member, and a liquid control valve member journaled in said bore.

4. A unit for entraining a liquid in finely divided droplet form in a gaseous carrier medium, comprising: a body having a top and a bottom and a gaseous carrier medium inlet passage therein, means secured to said bottom defining a liquid reservoir, means in said body communicating with said passage and said reservoir for entraining liquid droplets in said gaseous carrier medium and directing flow of the droplet carrier medium upwardly, a barrier member secured to said top for receiving the droplet carrier medium, said body having a passage therein communicating with the space between said barrier member and said top and terminating in said top at one side of said barrier member, and a plug for sealing the last-mentioned passage.

5. In a unit for entraining a liquid in finely divided droplet form in a gaseous carrier medium, comprising: a body having a gaseous medium inlet passage extending from one side thereof, a liquid supply bowl secured to the underside of said body, a liquid delivery tube secured to said body and disposed within said bowl, entraining means communicating with said inlet passage and said delivery tube for entraining liquid droplets in the gaseous medium flowing from said inlet, and a barrier member having a concave surface in the path of flow from said entraining means and positioned for drainage of liquid accumulating thereon into said supply bowl.

6. A unit for entraining liquid in finely divided droplet form in a gaseous carrier medium, comprising: a body having a gaseous medium inlet passage extending from one side thereof, a liquid supply bowl secured to the underside of said body, a liquid delivery tube secured to said body and disposed within said bowl, entraining means communicating with said inlet passage and said delivery tube for entraining liquid droplets in the gaseous medium flowing from said inlet and for directing the flow of the droplet carrying medium upwardly, a barrier member on the topside of said body in the path of flow from the droplet-carrying medium, and means for draining liquid accumulating on said barrier into said supply bowl.

References Cited in the file of this patent

UNITED STATES PATENTS

| Number | Name | Date |
| --- | --- | --- |
| 694,630 | Golterman | Mar. 4, 1902 |
| 1,263,079 | Leon | Apr. 16, 1918 |
| 1,526,646 | Smith et al. | Feb. 17, 1925 |
| 2,532,441 | Cox | Dec. 5, 1950 |
| 2,565,691 | Ketelsen | Aug. 28, 1951 |
| 2,571,770 | Semon | Oct. 16, 1951 |
| 2,605,087 | Dautrebande | July 29, 1952 |
| 2,610,700 | Gothberg | Sept. 16, 1952 |
| 2,613,067 | Goodyer | Oct. 7, 1952 |

FOREIGN PATENTS

| Number | Country | Date |
| --- | --- | --- |
| 614,522 | France | Dec. 16, 1926 |